United States Patent [19]
Seo et al.

[11] Patent Number: 5,349,414
[45] Date of Patent: Sep. 20, 1994

[54] APERTURE-PRIORITY LENS SHUTTER APPARATUS FOR A CAMERA

[75] Inventors: Jae-kyeong Seo; Seon-ho Lee; Deog-ho Choi, all of Kyeongsangnam, Rep. of Korea

[73] Assignee: Samsung Aerospace Industries, Ind., Kyeongsangnam, Rep. of Korea

[21] Appl. No.: 150,403

[22] Filed: Nov. 10, 1993

[30] Foreign Application Priority Data

Nov. 16, 1992 [KR] Rep. of Korea ............... 92-21489

[51] Int. Cl.$^5$ ............... G03B 13/36; G03B 7/097
[52] U.S. Cl. ............... 354/400; 354/435
[58] Field of Search ............... 354/435, 436, 437, 438, 354/439, 440, 400, 234.1

[56] References Cited

U.S. PATENT DOCUMENTS

| | | | |
|---|---|---|---|
| 4,470,687 | 9/1984 | Saito et al. | 354/435 |
| 4,772,841 | 9/1988 | Maruyama et al. | 354/234.1 X |
| 4,959,680 | 9/1990 | Ishida et al. | 354/435 |
| 5,255,049 | 10/1993 | Akimoto et al. | 354/439 |
| 5,291,237 | 3/1994 | Tagami et al. | 354/435 X |

Primary Examiner—W. B. Perkey
Attorney, Agent, or Firm—Francis C. Hand

[57] ABSTRACT

An aperture-priority lens shutter apparatus for a camera has a compact construction and an automatic exposure control function. The aperture-priority electromagnetic lens shutter apparatus for a camera comprises a lens mount; two lens shutter blades serving as a lens shutter and a diaphragm at the same time; a driving mechanism for driving the lens shutter blades; a button switch for setting an F number manually; a light measuring circuit for emitting a signal corresponding to the amount of light available to photograph an object; and a central processing unit including an exposure control time table in which the exposure control data are inputted, an operator for operating an exposure time in case of a semiautomatic mode and a driver for driving the driving mechanism.

8 Claims, 10 Drawing Sheets

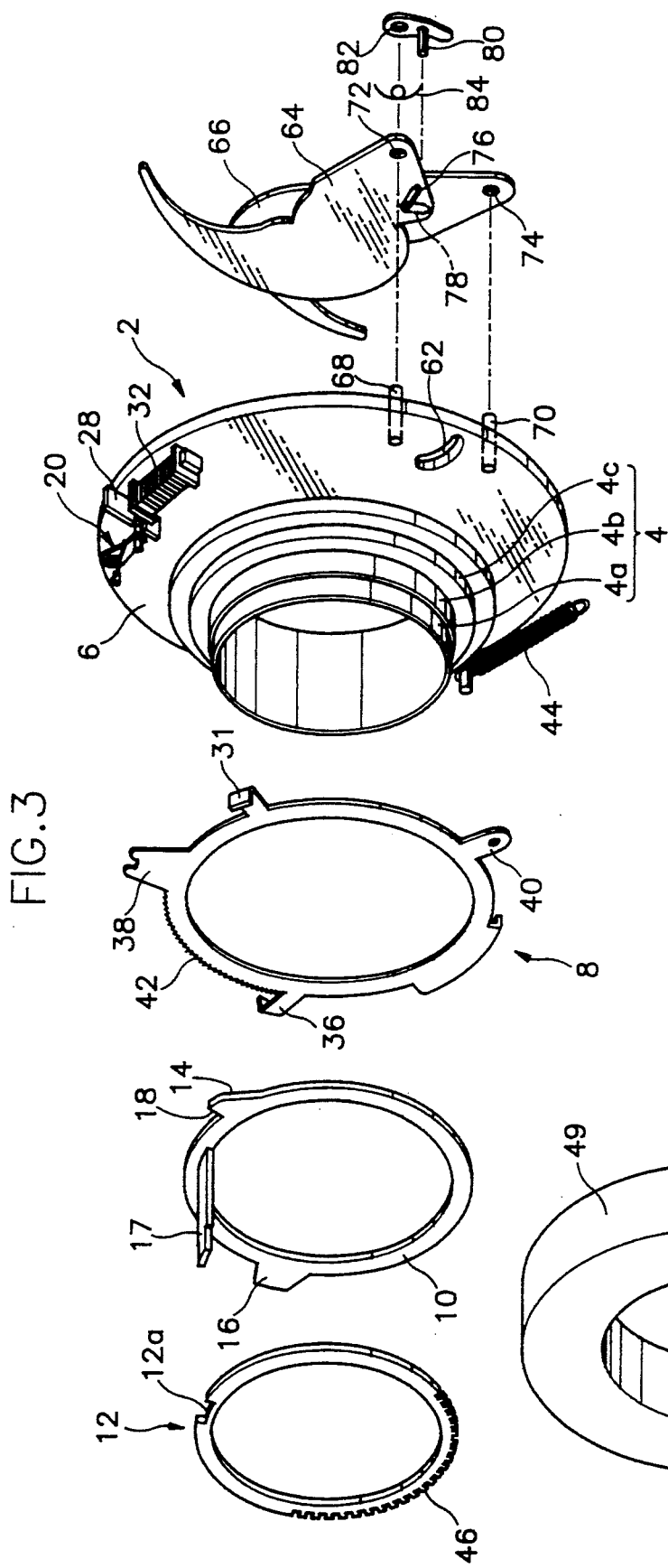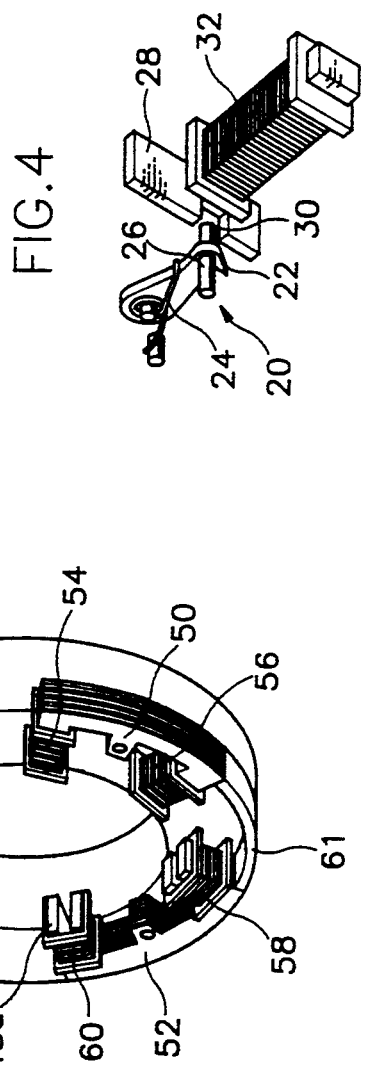

APERTURE-PRIORITY LENS SHUTTER APPARATUS FOR A CAMERA

BACKGROUND OF THE INVENTION

1. Field of the Invention

The present invention relates to an electromagnetic lens shutter apparatus for a camera. More particularly, this invention relates to a camera having an electromagnetic lens shutter apparatus for a camera which can be actuated on an aperture-priority basis.

2. Description of the Prior Art

Generally, the opening and closing functions of a lens shutter blade are carried out by controlling a direction and a time of an electrical current which flows through an electromagnet in a camera having an electromagnetic lens shutter apparatus. Such an electromagnetic lens shutter apparatus has a simple construction compared with a mechanical shutter which uses a mechanical spring force to effect the opening and closing functions of a lens shutter blade.

U.S. Pat. No. 4,881,093 discloses an electromagnetically operated lens shutter assembly for a camera which includes permanent magnets which are affixed to lens shutter blades. An electromagnetic field is generated by a number of armatures which interact with the permanent magnets to cause the lens shutter blades to move between open and closed positions. The configurations of the permanent magnets and armatures permit the blades to be held in the open and closed positions without the further application of current to the armatures. Also, the permanent magnets are levitated by the electromagnetic field in order to facilitate movement of the lens shutter blades between the opening and closing positions. However, such a lens shutter cannot be applied to an automatic focus and exposure camera.

Japanese Patent Publication No. 90-33130 describes an electromagnetically operated lens shutter mechanism in which a first moving coil member for moving a lens shutter blade between an affixed permanent magnet and a yoke at an opposing position of the permanent magnet and a second moving coil member for deciding an open degree of the lens shutter blade are provided. An operation of both moving coil members is carried out at a predetermined time difference, so that an automatic exposure is effected. However, since the lens shutter in this manner does not have an automatic focusing function, it is applied only to a simple fixed focus camera and cannot be applied to a zoom camera commonly used at the present time.

The inventors of the present invention made a Korean Pat. Appln. No. 92-21057 which describes an electromagnetic lens shutter apparatus which has a compact construction and can be applied to an automatic focus and exposure control camera. However, focusing and exposing is automatically controlled in accordance with a program previously inputted in a central process unit.

In some instances, in addition to an automatic focus and exposure control function there is a time when a user may wish to adjust an F number manually, namely the lens shutter has to be operated on an aperture-priority basis. For example, this function is required in case that the user wants to adjust a depth of field. In this case, in addition to an automatic exposing adjustment function, a lens shutter apparatus having a semiautomatic function is required in order to permit a lens shutter speed to be adjusted in accordance with the F number which is set manually in advance.

SUMMARY OF THE INVENTION

It is an object of the invention to provide a lens shutter apparatus for a camera which has a compact construction and an automatic exposure function and can be actuated on an aperture-priority basis to overcome the disadvantages of the prior art described above.

Briefly, the invention provides a lens shutter apparatus for a camera actuated on an aperture-priority basis which comprises:

- a lens mount including a hollow cylindrical portion defining an opening and a flange fixed on the cylindrical portion;
- at least two sheet-like lens shutter blades rotatably mounted on the flange of the lens mount on a side opposite the cylindrical portion to cover over the opening, and an open degree of the lens shutter blades being decided in accordance with an F number and an open time of the lens shutter blades being decided in accordance with an exposure time;
- a first means for driving the lens shutter blades;
- a second means for setting the F number manually;
- a light measuring means for producing a signal corresponding to the amount of light available to photograph an object; and
- a central processing unit including an exposure control time table in which the F number for exposure in a suitable exposure value in accordance with the measured value by the light measuring means and exposure time data are inputted, an operator which recognizes the F number set manually in a semiautomatic mode, receives the data from the exposure control time table corresponding to a signal from the light measuring means, calculates a time for maintaining the exposure state in the set F number, adds the exposure time from the exposure control time table to the time for maintaining the exposure state and calculates a total exposure time, and a driver for driving the first means in accordance with a result from the operator.

BRIEF DESCRIPTION OF THE DRAWINGS

These and other embodiment and features of the present invention will become more readily apparent upon reading the following detailed description in conjunction with the attached drawings, in which:

FIG. 3 is an exploded perspective view schematically illustrating a construction of a preferred embodiment of an aperture-priority electromagnetic lens shutter apparatus for a camera in accordance with the present invention;

FIG. 4 is an enlarged perspective view illustrating a ratchet operation mechanism shown in FIG. 3 in accordance with the present invention;

DESCRIPTION OF THE PREFERRED EMBODIMENT

Figure 1:
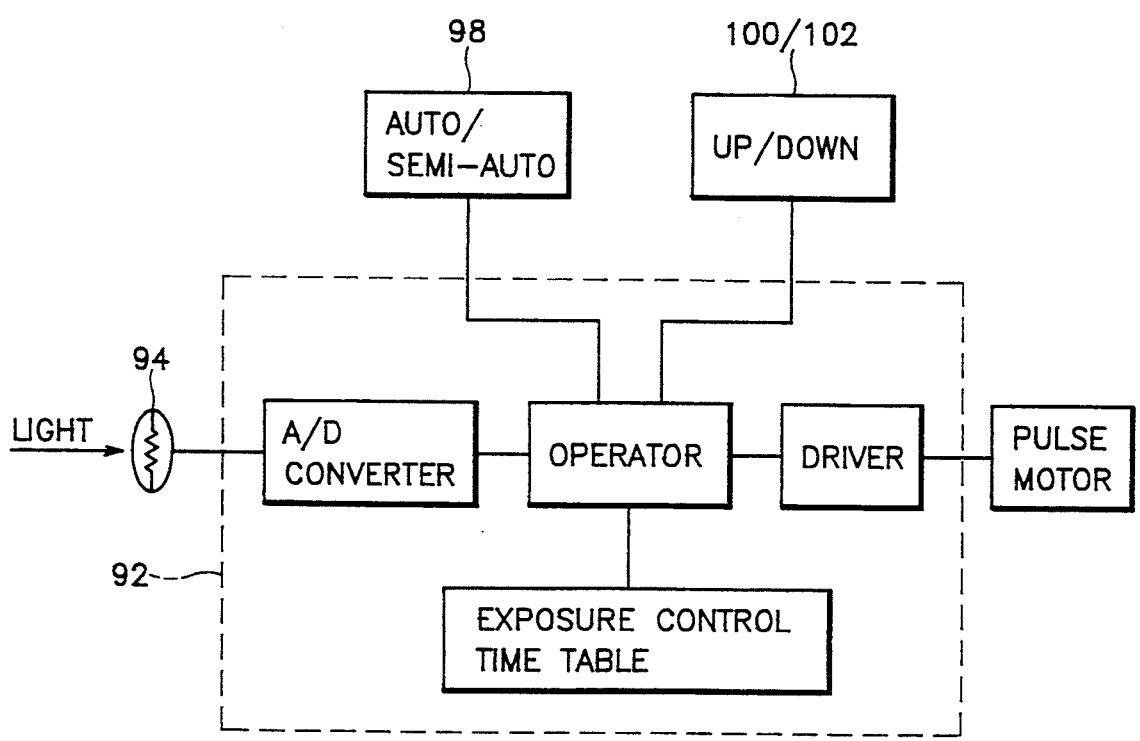
FIG. 1 is a block diagram illustrating an exposure control sequence in an aperture priority lens shutter apparatus for a camera in accordance with the present invention.

First, a lens shutter apparatus used for a camera in accordance with the present invention will be described, referring to the embodiments shown in FIGS. 3 or 11.

Referring to FIG. 3, the electromagnetic lens shutter apparatus for a camera has a lens mount 2 which comprises a hollow cylindrical portion 4 having three step diameter portions 4a, 4b and 4c and a flange 6 fixed on one end of the cylindrical portion 4. In addition, a focus adjustment ring 8, an exposure adjustment ring 10 and a rotor 12 are rotatably mounted on the outer circumference of the cylindrical portion 4.

An exposure adjustment cam 10 for adjusting an open time degree of a pair of lens shutter blades, a lug 18 and a release cam 16 are formed on the outer periphery of the exposure adjustment ring 10 sequentially in a counterclockwise direction.

In accordance with the counterclockwise rotation of the exposure adjustment ring 10, the release cam 16 moves a ratchet 20 which is rotatably mounted on the flange 6 of the lens mount 2. As shown in FIG. 4, the ratchet 20 has a pawl 22 and a pin 26.

The ratchet 20 is pressed by a torsion spring 24 in a predetermined direction. If the exposure adjustment ring 10 is rotated in the counterclockwise direction, the pin 26 is pushed by the release cam 16, and the ratchet 20 is rotated in the counterclockwise direction.

The pin 26 of the ratchet 20 meshes with a notch 30 formed in an engaging member 28 made of magnetic material. The engaging member 28 is slidably mounted on the flange 6 at a predetermined spacing from an electromagnet 32 placed on the flange 6 of the lens mount 2, and the engaging member 28 is attracted to the electromagnet 32 if the electromagnet 32 is excited.

Referring to FIG. 3, a front arm 31, a rear arm 36, a lens interlocking arm 38 and a fixed projection 40 are formed in the outer circumference of the focus adjustment ring 8. A ratchet gear 42 which engages with the pawl 22 of the ratchet 20 is formed in a predetermined portion of the outer circumference of the focus adjustment ring 8 i.e., between the arms 36 and 38. As shown in FIG. 3, it is preferable that the lens interlocking arm 38 be formed in a fork shape and forms a lens interlocking means together with a lever 90 (See FIG. 10) that will be described later.

The ratchet 20, the ratchet gear 42, the torsion spring the engaging member 28 and the electromagnet 32 form a locking means for selectively locking the focus adjustment ring 8 against rotation.

When the focus adjustment ring 8 is mounted on the outer circumference of the diameter portion 4c of the cylindrical portion 4, the front arm 31 contacts the counterclockwise side of the lug 18 of the exposure adjustment ring 10 mounted on the outer circumference of the diameter portion 4b of the cylindrical portion 4.

The fixed projection 40 is connected to one end of a tension spring 44 with the other end thereof on the flange 6 of the lens mount 2. The tension spring 44 acts as a return means to return the focus adjustment ring 8 according to a signal from the distance measuring circuit 96 which will be described later.

The rotor 12 forms a linear pulse motor together with stators 50, 52 that will be described later to rotate the exposure adjustment ring 10. If the rotor 12 is installed on the outer circumference of the diameter portion 4a of the cylindrical portion 4, a rod 17 of the exposure adjustment ring 10 engages with a notch 12a of the rotor 12, and accordingly, the exposure adjustment ring 10 rotates in accordance with the rotation of the rotor 12. The number of the rod 17 and the notch 12a can be more than one.

Figure 5:
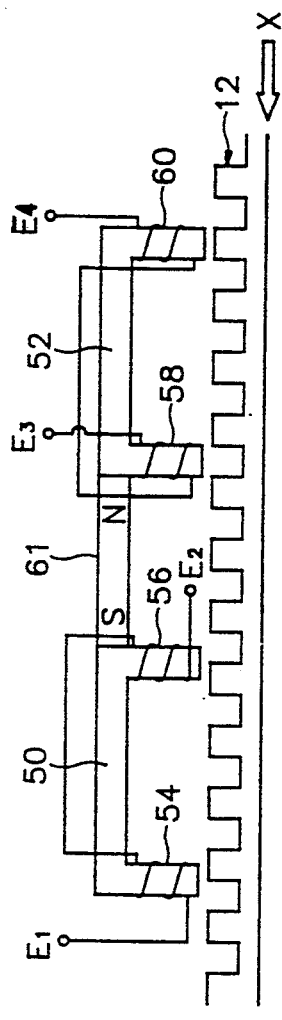
FIG. 5 is an imaginary schematic diagram illustrating the ring-shaped rotor and stator of FIG. 3 placed in a linear manner.

The stators 50, 52 are placed over the outer circumference of the rotor 12 at a predetermined distance from the rotor 12. Each stator 50, 52 is of C-shape and has two armatures 54, 56 and 58, 60, respectively. A permanent magnet 61 is placed between both stators 50, 52. In FIG. 5, to explain the movement of the rotor 12 with respect to the stators 50, 52, the armatures are imaginarily exploded on a plane for ease of illustration. Actually, of course, the armatures 54, 56, 58 and 60 are circularly placed around the rotor 12 as shown in FIG. 3.

Referring to FIG. 5, each armature 54, 56, 58, 60 has the same coil winding direction. Electric current is separately supplied to the armatures 54 and 56 of the stator 50 and to the armatures 58 and 60 of the stator 52.

The interval between two armatures 58, 60 of the stator 52 are set to allow the armatures 58, 60 to be disposed opposite one of the grooves and one of the projections of the rotor 12, respectively. Namely, if the armature 58 is opposite to the grooves of the rotor 12, the armature 60 becomes opposite to the projections of the rotor 12. This is also true of the distance between the armatures 54, 56 of the stator 50.

FIGS. 6A to 6D illustrate the operation of the rotor shown in FIG. 5 in four steps. In FIGS. 6A to 6D, it is assumed that the coil of each armature is would in the direction shown in FIG. 5.

Figure 6A:
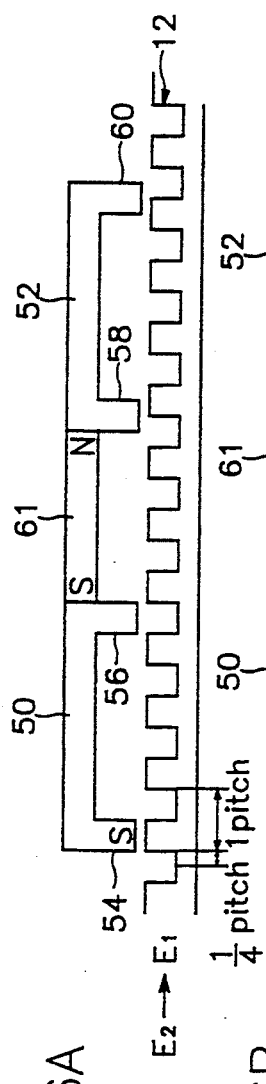
FIGS. 6A to FIGS. 6D are schematic diagrams illustrating the motions of the rotor shown in FIG. 5 in accordance with the invention.

In a first step, as indicated in FIG. 6A the current flows from an E2 terminal to an E1 terminal only. Accordingly, the end portion of the armature 54 turns to a south pole and the end portion of the armature 56 turns to a north pole. However, since the north pole of the end portion of the armature 56 is offset by a south pole of the permanent magnet 61 and the magnetic force of the south pole of the armature 54 doubles, the projections of the rotor 12 opposite to the end portion of the armature 54 are pulled and the rotor 12 is moved to the left in FIG. 6A by a quarter pitch.

Figure 6B:
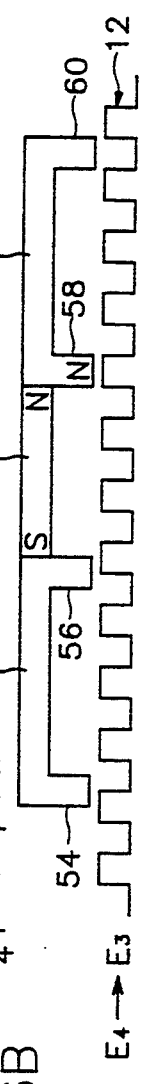
Figure 6C:
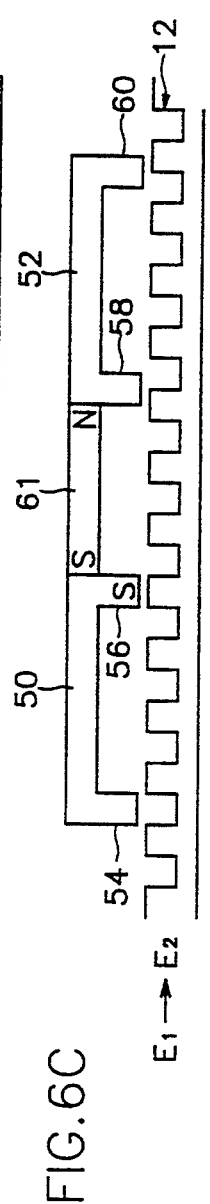
Figure 6D:
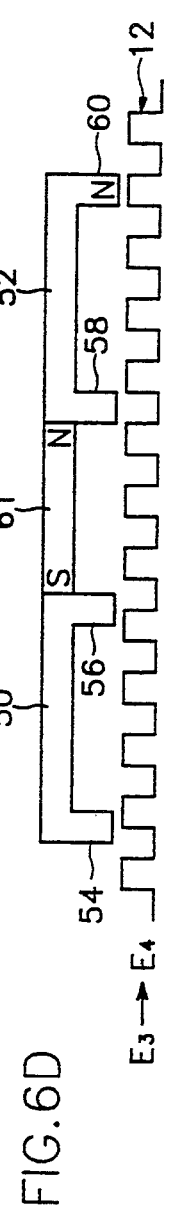

In a second step, as indicated in FIG. 6B the current flows from an E4 terminal to an E3 terminal only. In a third step, as indicated on FIG. 6C the current flows from the E1 terminal to the E2 terminal only. And in a fourth step, as indicated in FIG. 6E the current flows from the E3 terminal to the E4 terminal only. In the second, the third and the fourth steps, the end portion polarity of each armature corresponds to that shown in each corresponding figure, and since the end portion polarity of each armature pulls the projections of the adjacent rotor 12 as in the first step, the rotor 12 is moved to the left of the figure by a quarter pitch at each step.

If one cycle from the first step to the fourth step is completed, the rotor 12 is moved to the left in FIG. 6A by one pitch. Accordingly, the rotor 12 is rotated in the counterclockwise by one pitch. The rotor 12 can be rotated in the reverse direction by altering the order and direction of the current flow described in the above.

Referring again to FIG. 3, a circular slot 62 is formed in the flange 6 of the lens mount 2 approximately radially to the cylindrical portion 4.

Figure 7:
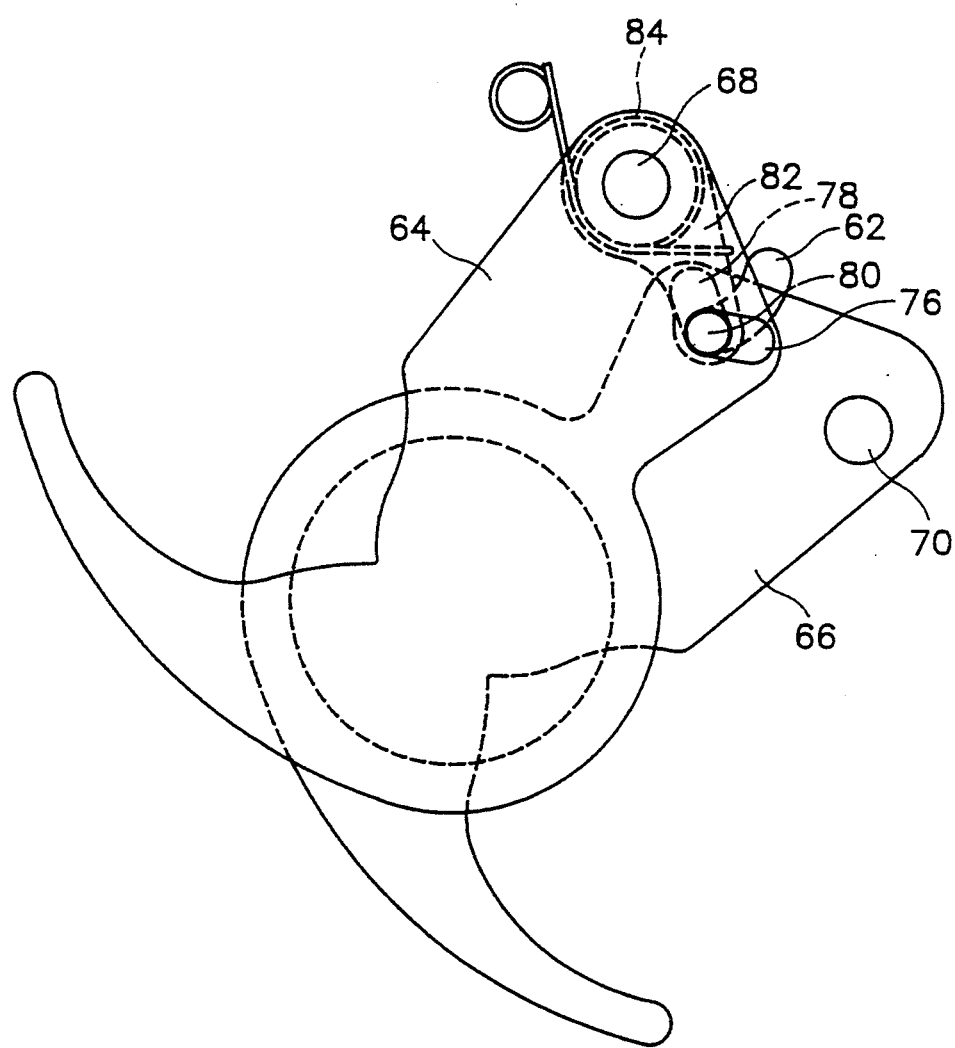
FIG. 7 is a view of the lens shutter blades shown in FIG. 3 in a closed state in accordance with the present invention.

A pair of sheet-like lens shutter blades 64, 66 which are mirror-symmetric each other are rotatably supported on the flange 6 on an opposite side of the cylindrical portion 4. The configurations of these lens shutter blades 64, 66 are shown in FIG. 7, 8.

A guide slot 78 and a hinge aperture 74 are formed in the blade 66, and a guide slot 76 and a hinge aperture 72 are formed in the blade 64 mirror symmetric against the guide slot 78 and the hinge aperture 74 in the blade 66.

The blade 64, 66 are rotatably supported on support pins 68, 70 secured in the flange 6 via each hinge aperture 72, 74, respectively.

The support pin 68 passes through the hinge aperture 72 of the blade 64, and also rotatably supports a guide arm 82.

A guide pin 80 slidably mounted within the circular slot 62 is fixed in the guide arm 82. The guide arm 82 is always biased in the clockwise direction by a torsion spring 84. The guide pin 80 passes through the guide slots 76, 78 of the lens shutter blades 64, 66 through the circular slot 62 of the flange 6 and contacts the surface of an exposure adjustment cam 14 in the exposure adjustment ring 10.

The circular slot 62, guide arm 82, torsion spring 84 and side slots 76, 78 form an opening means which open and close the lens shutter blades 64, 66 in accordance with the operation of the exposure adjustment cam 14.

Figure 8:
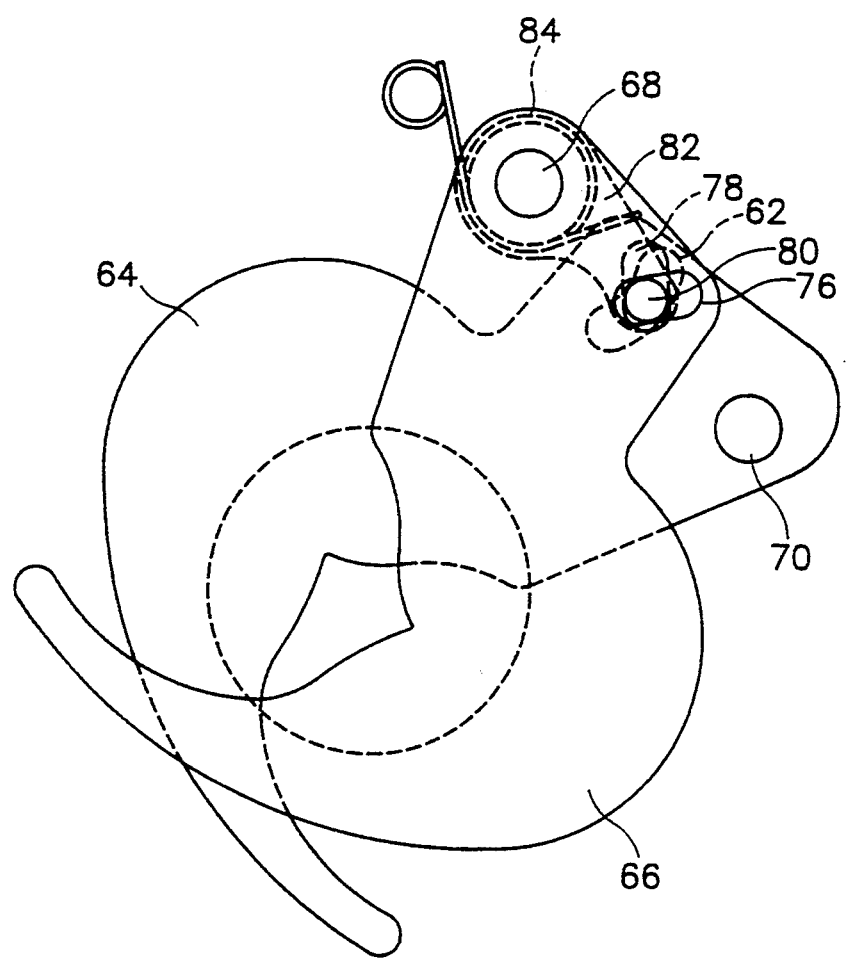
FIG. 8 is a view of the lens shutter blades shown in FIG. 7 in an open state.

FIGS. 7 and 8 illustrate the closed and open states of the lens shutter blades 64, 66 respectively. If the exposure adjustment ring 10 rotates in a clockwise direction, the guide pin 80 is pushed by the exposure adjustment cam 14 along the slot 62 outwardly in a radial direction of the flange 6. Accordingly, as shown in FIG. 8, the lens shutter blades 64, 66 are respectively rotated outwardly of each other, rotating around the support pins 68, 70, and opened.

At this time, the movement distance of the guide pin 80 can be controlled by a rotation angle of the exposure adjustment cam 14, and an open degree of the lens shutter blades 64, 66 can be controlled.

Figure 12:
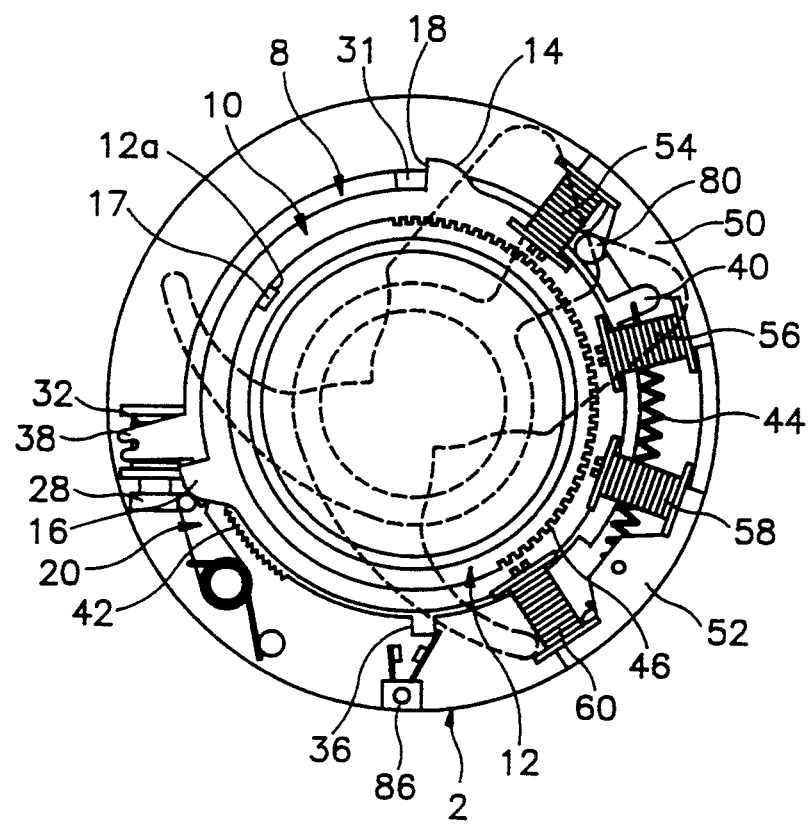
FIG. 12 is a schematic diagram illustrating the lens shutter apparatus for a camera with the focus adjustment ring of FIG. 9 in a released stated.

Referring to FIG. 12, the rotor 12 installed on the outer circumference of the cylindrical portion 4 can be rotated by the armatures 54, 56, 58 and 60. Since the rotor 12 and the exposure adjustment 10 are connected to each other by the rod 17, the exposure adjustment ring 10 is rotated together with the rotor 12. If the exposure adjustment ring 10 is rotated in a counterclockwise direction, since the front arm 31 of the focus adjustment ring 8 is pushed by the lug 18 of the exposure adjustment ring 8, the exposure adjustment ring 8 is also rotated in the counterclockwise direction. At the same time, since the release cam 16 of the focus adjustment ring 10 pushed the pin 26, the ratchet 20 is rotated in a counterclockwise direction and the focus adjustment ring 10 is released. Also, a rear arm 36 of the focus adjustment ring 8 turns OFF a contact switch 86 arranged on the flange 6 of the lens mount 2, and thereby an electric signal is generated. This electric signal is applied to a central processing unit which will be described later.

Figure 10:
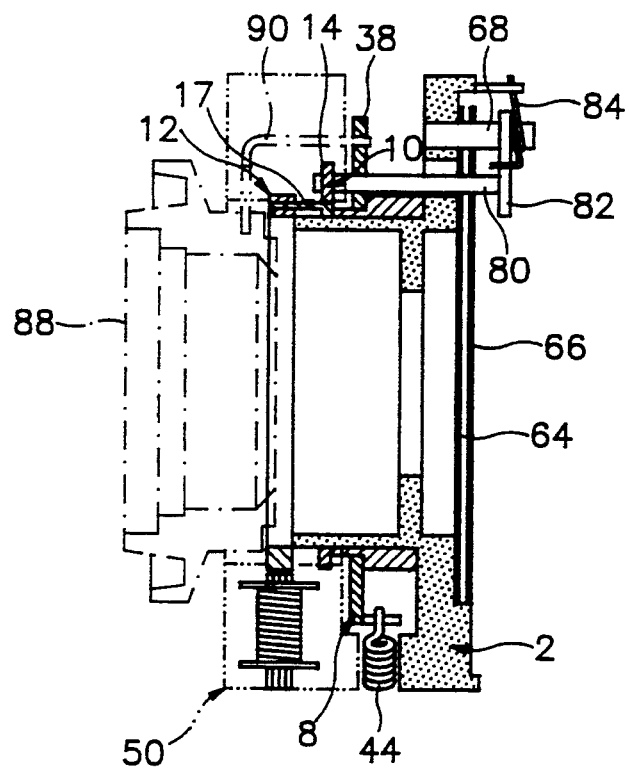
FIG. 10 is a side view of the assembled electromagnetic lens shutter apparatus for a camera shown in FIG. 3.

As shown in FIG. 10, a lens barrel 88 is installed in front of the lens mount 2.

A lever 90 is placed in a movable lens part of the lens barrel 88, and the lever 90 is connected to the interlocking part 38 of the focus adjustment ring 8. As shown in FIG. 3, the end portion of the arm 38 can be advantageously formed in a fork shape for easy assembling of the interlocking arm 38 and the lever 90.

Figure 11:
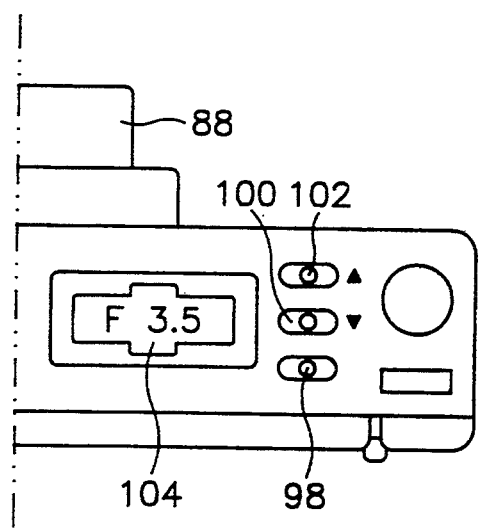
FIG. 11 is a plan view of an example of an arrangement of an automatic and semiautomatic conversion button of a camera.

Referring to FIG. 11, the camera has a button 98 for the mode selection and aperture diaphragm buttons 100 and 102. The mode selection button 98 functions to select either an automatic mode which does not require an additional setting of the F number by the user or a semiautomatic mode requiring the manual setting of the aperture diaphragm (i.e. lens shutter blades). Also, the aperture diaphragm buttons 100 and 102 are the buttons respectively for upward and downward settings of the diaphragm (i.e. F number). Of course, the aperture diaphragm buttons 100 and 102 are used only when the mode selection button 98 is in the semiautomatic mode. The F number set by the aperture diaphragm buttons 100 and 102 can be displayed by a display device, such as liquid crystal panel 104.

Figure 2:
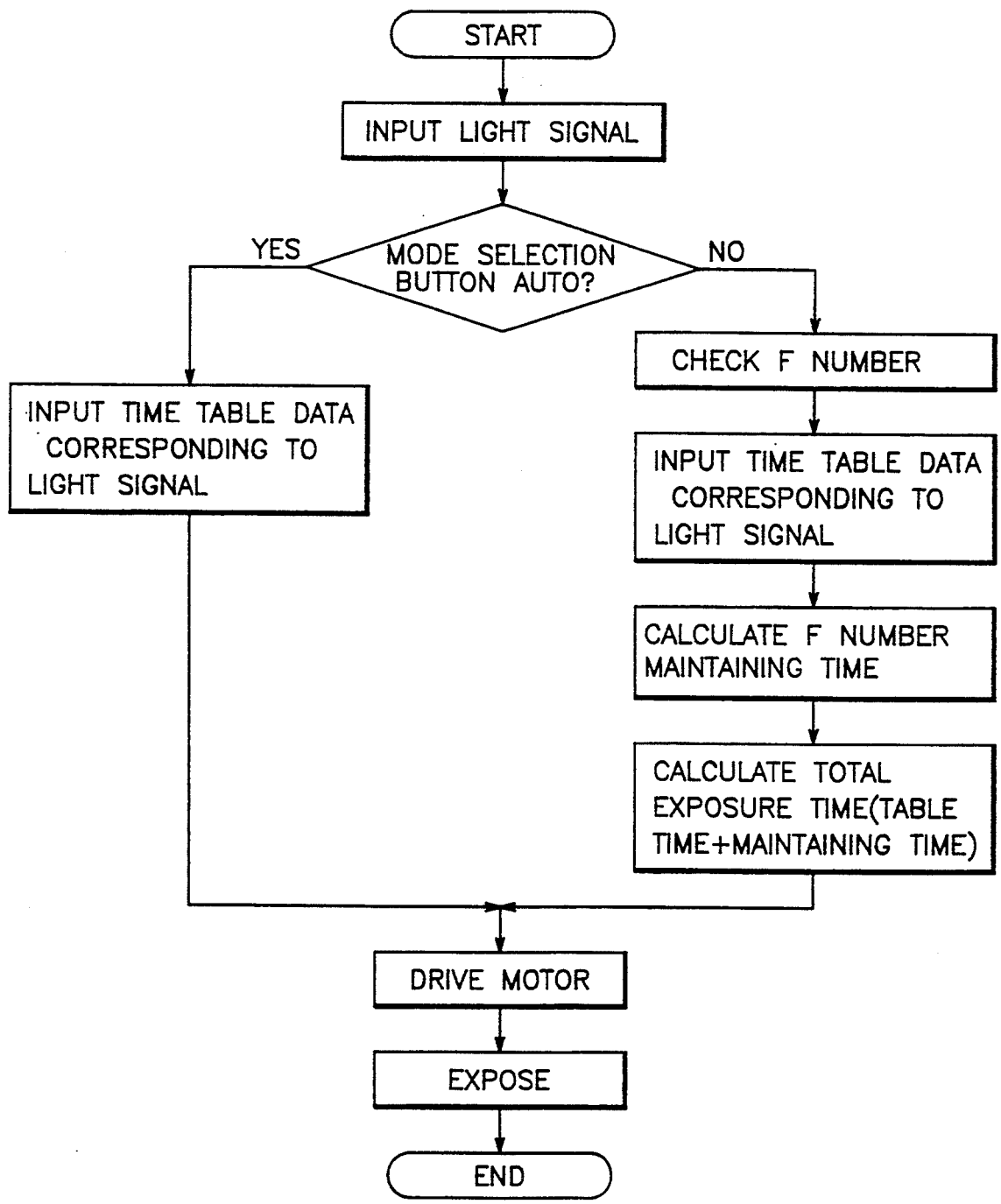
FIG. 2 is a flow chart illustrating a control method of an aperture-priority lens shutter apparatus for a camera in accordance with the present invention.

Now, referring to FIGS. 1 and 2, an exposure control method of the aperture-priority electromagnetic lens shutter apparatus for a camera in accordance with the present invention is explained.

The CPU 92 includes the exposure control time table, the operator and the driver. The F number and the exposure time data for the suitable exposure in accordance with the measured value by the light measuring circuit 94 are inputted in the exposure control time table. The operator calculates the exposure time for a suitable exposure value. In addition, the driver drives the above-mentioned linear pulse motor in accordance with the calculated result from the operator.

First, if the lens shutter is pressed, a signal from the light measuring circuit 94 passes through an analogue-/digital converter (A/D converter) in the CPU 92 and is inputted to the operator. The operator decides whether a mode selection button is in the automatic mode or in the semiautomatic mode.

In the case of the semiautomatic mode, the operator checks first the manually established F number. Next, the data from the control time table which corresponds to the signal from the light measuring circuit 94 is inputted to the operator. The operator operates the time that maintains exposure state in the established F number, adds the time that maintains exposure state to the exposure time from the control time table, and so operates the total exposure time. The driver drives the linear pulse motor in accordance with the operation result from the operator, and then the exposure operation is carried out.

In the case of the automatic mode, the F number and the exposure time data from the control time table which corresponds to the signal from the light measuring circuit 94 are inputted to the operator, the driver drives the linear pulse motor in accordance with the data, and the exposure operation is carried out.

Figure 15:
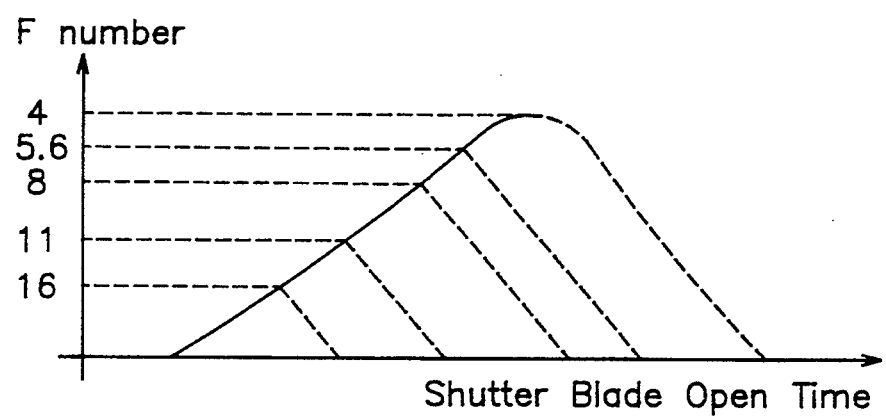
FIG. 15 is a graph showing the relation between the F number and the lens shutter open time in case of the automatic exposing.

FIG. 15 is a graph showing the relation between the F number and the lens shutter blades open time in the case of the automatic mode. In this graph, the opening of the lens shutter blades is carried out in accordance with the full line and the closing of the lens shutter blades is carried out in accordance with the dotted line. It is concluded that an area of a closed curve defined by a horizontal axis, the full line and the dotted line represents the size of the exposure value.

Figure 16:
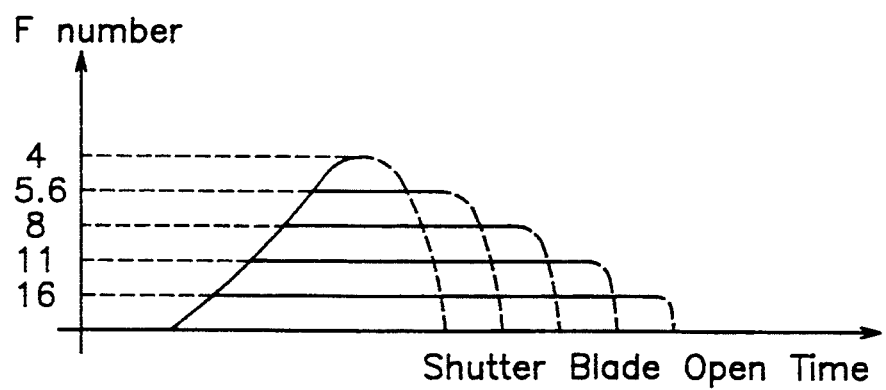
FIG. 16 is a graph showing the relation between the F number and the lens shutter open time to obtain the same exposure value each other in case of the semiautomatic exposing.

FIG. 16 is a graph showing the relation between the F number and the lens shutter open time to obtain the same exposure value each other in case of the semiautomatic exposing. As shown in FIG. 15, likewise, the opening of the lens shutter blades is carried out in accordance with the full line and the closing of the lens shutter blades is carried out in accordance with the dotted line. It is concluded that the areas of the closed curves that corresponds to the F numbers must be same to make the exposure value when the F number is 5.6 be equal with the exposure value when the F number is 4. To make the areas be same, when the F number is 5.6, the exposure state must be maintained for a predetermined time. On the other hand, in the case of semiautomatic mode, the operator operates the time that the exposure state is maintained as described the above and adds the time that the exposure state is maintained to the exposure time from the exposure control time table.

Lastly, the operation of the electromagnetic lens shutter apparatus for a camera in accordance with the present invention is explained.

Figure 9:
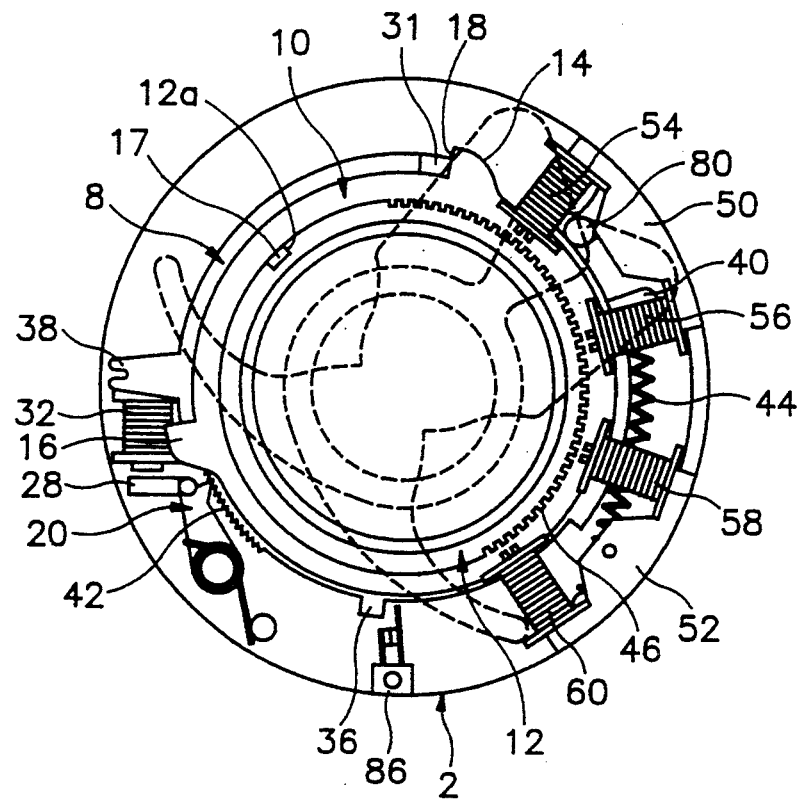
FIG. 9 is a front view of the assembled electromagnetic lens shutter apparatus for a camera shown in FIG. 3.

FIG. 9 shows an early operation state of the shutter. If the shutter button (not shown) is pressed, the light measuring circuit 94 and the distance measuring circuit (not shown) are operated and the ambient brightness around the object and the distance from the object are measured. Sequently, current flows to the stators 50, 52 in accordance with the control signal from the CPU 92. As shown in FIG. 12, the rotor 12 is rotated counterclockwise and the ratchet 20 is rotated to the release position by the release cam 16 of the exposure adjustment ring 10. At this time, the focus adjustment ring 8 is also rotated by being pushed by the lug 18 of the exposure adjustment ring 10 and thereby the contact switch 86 is turned OFF. In accordance with this operation, the operation start signal is inputted to the CPU 92.

The CPU 92 which received the operation start signal excites the electromagnet 32 and thereby the engaging member 28 is pulled to the electromagnet 32 so that the ratchet 20 is held in the release position. The CPU 92 outputs a rotation signal corresponding to a distance value measured by the distance measuring circuit (not shown) to the stators 50, 52. As a result, the rotor 12 is rotated at an angle corresponding to said distance value. At this point, the focus adjustment ring 8 is also rotated by the torsion spring 44 clockwise.

Figure 13:
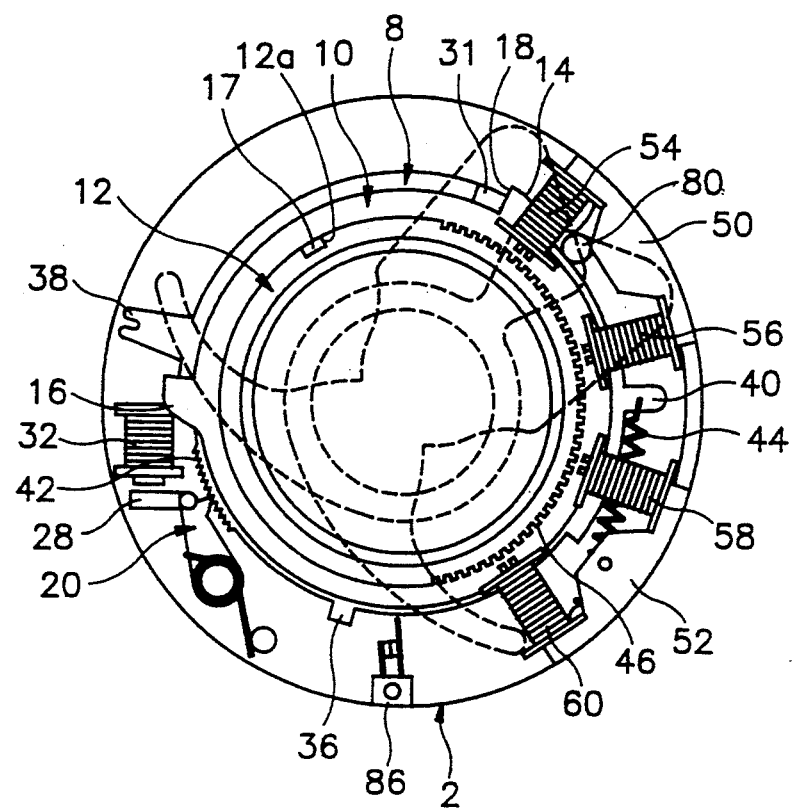
FIG. 13 is a schematic diagram illustrating the focus adjustment ring of FIG. 12 in a state to control the focus.

If the rotation operation of the rotor 12 stops at an the angle corresponding to the above-mentioned distance value, the CPU 92 demagnetizes the electromagnet 32. Thus, the ratchet 20 is biased by the torsion spring 24, and the pawl 22 is engaged with the ratchet gear 42 of the focus adjustment ring 8 as shown in FIG. 13.

While the focus adjustment ring 8 is rotated by a spring 44 clockwise till the front arm 31 of the focus adjustment ring 10 contacts the lug 18, the lever 90 rotating together with the lens interlocking arm 38 rotates the movable part of the lens barrel 88, and thereby the focus control is carried out. And in accordance with the control of the CPU 92, current flows to the stators 50, 52 for the rotor 12 to be further rotated clockwise by an angle corresponding to the measured value from the light measuring circuit 94.

Figure 14:
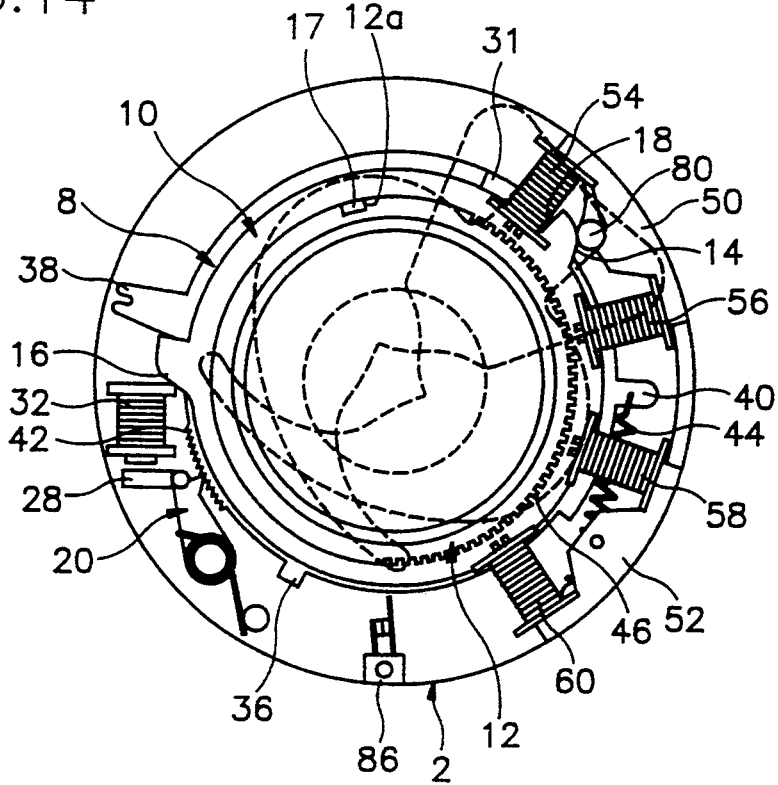
FIG. 14 is a schematic diagram illustrating the opening of the lens shutter by the rotation of the exposure adjustment ring of FIG. 12 in accordance with the invention.

Accordingly, as shown in FIG. 14, the exposure adjustment cam 14 of the exposure adjustment ring 10 pushes the guide pin 80 and opens the lens shutter blades 64, 66.

As described, the open degree of the lens shutter blades 64, 66 is decided by the distance the guide pin 80 is rotated by the exposure adjustment cam 14. Also, an open time period is determined by the time taken by the focus adjustment ring 10 in rotating counterclockwise via an inverting signal of the CPU 92 in order to return the guide pin 80 to the initial position. If the focus adjustment ring 10 is rotated counterclockwise in accordance with the inverting signal and returns to the state shown in FIG. 9, one cycle of the lens shutter is completed. The lens shutter blades serve as the diaphragm and the lens shutter in the electromagnetic lens shutter apparatus for a camera in accordance with the present invention. Accordingly, the open amount and the open time of the lens shutter blades herein correspond to the open amount of the diaphragm and the open time of the lens shutter respectively.

In summary, the operation of the electromagnetic lens shutter apparatus for a camera can be exemplified in six steps.

In a first step, if the shutter button is pressed to a first stage, the light measuring circuit 94 and the distance measuring circuit (not shown) are operated, and the ambient brightness around the object and the distance from the object are measured. Sequentially, the rotor of the linear pulse motor is rotated in a rotation direction in accordance with the control signal from the CPU 92, the locking means is released by the release cam 16, the focus adjustment ring 8 is also rotated in the rotation direction (counterclockwise as viewed in FIG. 12) since the front arm 31 is pushed by the lug 18, and a predetermined electronic start signal is inputted to the CPU 92 by the contact switch 86 operated in accordance with the rear arm 36.

In a second step; the locking means is held in the release position in accordance with the control signal from the CPU 92, and the CPU 92 outputs an inverting signal corresponding to a distance value measured by the distance measuring circuit (not shown) to the linear pulse motor.

In a third step; the rotor of the linear pulse motor is rotated in the opposite direction by an angle corresponding to the distance value, and the focus adjustment ring 8 is also rotated in the opposite direction (clockwise) by the return means. 44.

In a fourth step; the linear pulse motor stops, and the focus adjustment ring 8 is locked by the locking means in accordance with the control signal from the CPU 92.

In a fifth step; if the shutter button is pressed to a second state, the rotor of the linear pulse motor is further rotated in the opposite direction by the corresponding angle to the measured value from the light measuring circuit 94 in accordance with the control signal of the CPU 92. Thus, the exposure adjustment cam 14 of the exposure adjustment ring 10 operates the opening means, and thereby the lens shutter blades 64, 66 are opened.

In a sixth step; the exposure adjustment ring 10 is rotated in the rotation direction (counterclockwise) in accordance with a predetermined inverting signal from the CPU 92. Thus, the lens shutter blades 64, 66 return to the initial closed position via the opening means.

As described above, the electromagnetic lens shutter apparatus used for a camera of the present invention has a simple construction. In particular, the electromagnetic lens shutter apparatus can be applied to a camera with an aperture-priority automatic exposure function.

What is claimed is:

1. An aperture-priority lens shutter apparatus for a camera comprising:
    a lens mount including a hollow cylindrical portion defining an opening and a flange fixed on said cylindrical portion;
    at least two sheet-like lens shutter blades rotatably mounted on said flange of the lens mount on a side opposite said cylindrical portion to cover over the opening, and of which an open degree is decided in accordance with an F number and of which an open time is decided in accordance with an exposure time;
    a first means for driving the lens shutter blades;
    a second means for setting the F number manually;
    a light measuring means for producing a signal corresponding to the amount of light available to photograph an object; and
    a central processing unit including an exposure control time table in which the F number for exposure in a suitable exposure value in accordance with the measured value by said light measuring means and exposure time data are inputted, an operator which recognizes the F number set manually in a semiautomatic mode, receives the data from the exposure control time table corresponding to a signal from said light measuring means, calculates a time for maintaining the exposure state in the set F number, adds the exposure time from the exposure control time table to the time for maintaining the exposure state and calculating a total exposure time, and a driver for driving the first means in accordance with a result from the operator.

2. An aperture-priority lens shutter apparatus for a camera as set forth in claim 1 wherein said operator receives F number from the control time table corresponding to a signal from said light measuring means and exposure time data in case of the automatic mode, and said driver drives said first means in accordance with the data.

3. An aperture-priority lens shutter for a camera apparatus as set forth in claim 2 further comprising a mode selection button for selecting one of an automatic mode of operation and a semiautomatic mode of operation.

4. An aperture-priority lens shutter apparatus for a camera as set forth in claim 1 wherein said first means includes an exposure adjustment ring rotatably mounted on said cylindrical portion and including an exposure adjustment cam, a linear pulse motor controlled by said central processing unit and for rotating said exposure adjustment ring, and opening means for opening and closing said lens shutter blades in accordance with the rotation of said exposure adjustment cam.

5. An aperture-priority lens shutter apparatus for a camera as set forth in claim 4, wherein an exposure adjustment cam, a lug and a release cam in accordance with a predetermined rotation direction are sequentially formed on said exposure adjustment ring, and further comprising:
    a focus adjustment ring rotatably mounted on said cylindrical portion and including a front arm, a rear arm and a lens interlocking means formed sequentially in accordance with said predetermined rotation direction;
    a return means for driving said focus adjustment ring in the opposite direction to said rotation direction;
    a locking means for selectively locking said focus adjustment ring;
    a contact switch to generate an electronic start signal in accordance with the operation of said rear arm; and
    a distance measuring means for emitting a signal corresponding to a distance of the camera from the object to be photographed.

6. An aperture-priority lens shutter apparatus for a camera comprising:
    a first means for driving a lens shutter blades of a camera;
    a second means for setting an F number manually;
    a light measuring means for producing a signal corresponding to the amount of light available to photograph an object; and
    a central processing unit including an exposure control time table in which the F number for exposure in a suitable exposure value in accordance with the measured value by said light measuring means and exposure time data are inputted, an operator which recognizes the F number set manually in a semiautomatic mode, receives the data from the exposure control time table corresponding to a signal from said light measuring means, calculates a time for maintaining the exposure state in the set F number, adds the exposure time from the exposure control time table to the time for maintaining the exposure state and calculating a total exposure time, and a driver for driving the first means in accordance with a result from the operator.

7. An aperture-priority lens shutter apparatus for a camera as set forth in claim 6, wherein said operator receives F number from the control time table corresponding to a signal from said light measuring means and exposure time data in case of the automatic mode, and said driver drives said first means in accordance with the data.

8. An aperture-priority lens shutter apparatus for a camera as set forth in claim 7, further comprising a mode selection button for selecting one of an automatic mode of operation and a semiautomatic mode of operation.

* * * * *